(12) United States Patent
Murayama

(10) Patent No.: US 10,760,167 B2
(45) Date of Patent: Sep. 1, 2020

(54) ELECTROLYTIC CELL AND HYDROGEN PRODUCTION APPARATUS

(71) Applicant: KABUSHIKI KAISHA TOSHIBA, Minato-ku (JP)

(72) Inventor: Hirotoshi Murayama, Yokohama (JP)

(73) Assignee: KABUSHIKI KAISHA TOSHIBA, Minato-ku (JP)

(*) Notice: Subject to any disclaimer, the term of this patent is extended or adjusted under 35 U.S.C. 154(b) by 0 days.

(21) Appl. No.: 16/190,515

(22) Filed: Nov. 14, 2018

(65) Prior Publication Data
US 2019/0145012 A1    May 16, 2019

(30) Foreign Application Priority Data

Nov. 15, 2017    (JP) .................................. 2017-220465

(51) Int. Cl.
| | |
|---|---|
| C25B 1/10 | (2006.01) |
| C25B 9/08 | (2006.01) |
| C25B 1/06 | (2006.01) |
| C25B 11/03 | (2006.01) |
| C25B 13/02 | (2006.01) |
| C25B 15/08 | (2006.01) |

(52) U.S. Cl.
CPC .................. *C25B 1/10* (2013.01); *C25B 1/06* (2013.01); *C25B 9/08* (2013.01); *C25B 11/03* (2013.01); *C25B 13/02* (2013.01); *C25B 15/08* (2013.01); *C25B 11/035* (2013.01)

(58) Field of Classification Search
CPC .. C25B 9/08; C25B 15/08; C25B 1/10; C25B 1/00; C25B 1/04; C25B 9/00; C25B 9/18; C25B 1/46; C25B 9/206; C25B 13/00; C25B 1/06
See application file for complete search history.

(56) References Cited

U.S. PATENT DOCUMENTS

| | | | |
|---|---|---|---|
| 2012/0103829 A1* | 5/2012 | Tampucci | ................. C25B 1/02 205/637 |
| 2014/0224668 A1 | 8/2014 | Jehle et al. | |

(Continued)

FOREIGN PATENT DOCUMENTS

| | | |
|---|---|---|
| JP | 2012-193428 | 10/2012 |
| JP | WO2015/034088 A1 | 3/2015 |

(Continued)

*Primary Examiner* — Zulmariam Mendez
(74) *Attorney, Agent, or Firm* — Oblon, McClelland, Maier & Neustadt, L.L.P.

(57) ABSTRACT

An electrolytic cell includes a housing, a first diaphragm, a first electrode, a second electrode, and a first discharge port. The housing held an electrolyte solution. The first diaphragm partitions the interior of the housing into a first cell and a second cell. The first electrode is provided inside the first cell. The first electrode includes a first surface facing the first diaphragm, a second surface different from the first surface, and a first hole. The second electrode is provided inside the second cell adjacent to the first diaphragm. The second electrode includes a third surface adjacent to the first diaphragm, a fourth surface different from the third surface, and a second hole. The first discharge port discharges the electrolyte solution from the second cell. The first cell is configured to supply the electrolyte solution supplied therein to the third surface side of the second cell.

5 Claims, 6 Drawing Sheets

(56) References Cited

U.S. PATENT DOCUMENTS

| | | | |
|---|---|---|---|
| 2015/0027878 A1* | 1/2015 | Funakawa | C25B 1/46 204/252 |
| 2016/0186334 A1 | 6/2016 | Murahara | |
| 2016/0368789 A1 | 12/2016 | Manabe et al. | |

FOREIGN PATENT DOCUMENTS

| | | |
|---|---|---|
| JP | 2015-536383 A | 12/2015 |
| JP | 6088048 B2 | 3/2017 |
| KR | 10-1724060 B1 | 4/2017 |
| WO | WO 2011/004343 A1 | 1/2011 |
| WO | WO 2013/185163 A1 | 12/2013 |
| WO | WO 2017/190202 A1 | 11/2017 |

* cited by examiner

ELECTROLYTIC CELL AND HYDROGEN PRODUCTION APPARATUS

CROSS-REFERENCE TO RELATED APPLICATIONS

This application is based upon and claims the benefit of priority from Japanese Patent Application No. 2017-220465, filed on Nov. 15, 2017; the entire contents of which are incorporated herein by reference.

FIELD

Embodiments relate to an electrolytic cell and a hydrogen production apparatus.

BACKGROUND

Hydrogen gas can be produced by electrolyzing water using an electrolyte solution. It is necessary for a production apparatus of hydrogen gas to produce the hydrogen gas having higher purity.

DETAILED DESCRIPTION

An electrolytic cell according to an embodiment includes a housing, a first diaphragm, a first electrode, a second electrode, and a first discharge port. The housing is configured to hold an electrolyte solution. The first diaphragm is configured to partition the interior of the housing into a first cell and a second cell. The first electrode is provided inside the first cell. The first electrode includes a first surface facing the first diaphragm, a second surface different from the first surface, and a first hole configured to distribute the electrolyte solution between the first surface side and the second surface side. The second electrode is provided inside the second cell adjacent to the first diaphragm. The second electrode includes a third surface adjacent to the first diaphragm, a fourth surface different from the third surface, and a second hole configured to distribute the electrolyte solution between the third surface side and the fourth surface side. The first discharge port is configured to discharge the electrolyte solution from the second cell. The first cell is configured to supply the electrolyte solution supplied therein to the third surface side of the second cell.

First Embodiment

First, a first embodiment will be described.

Figure 1:
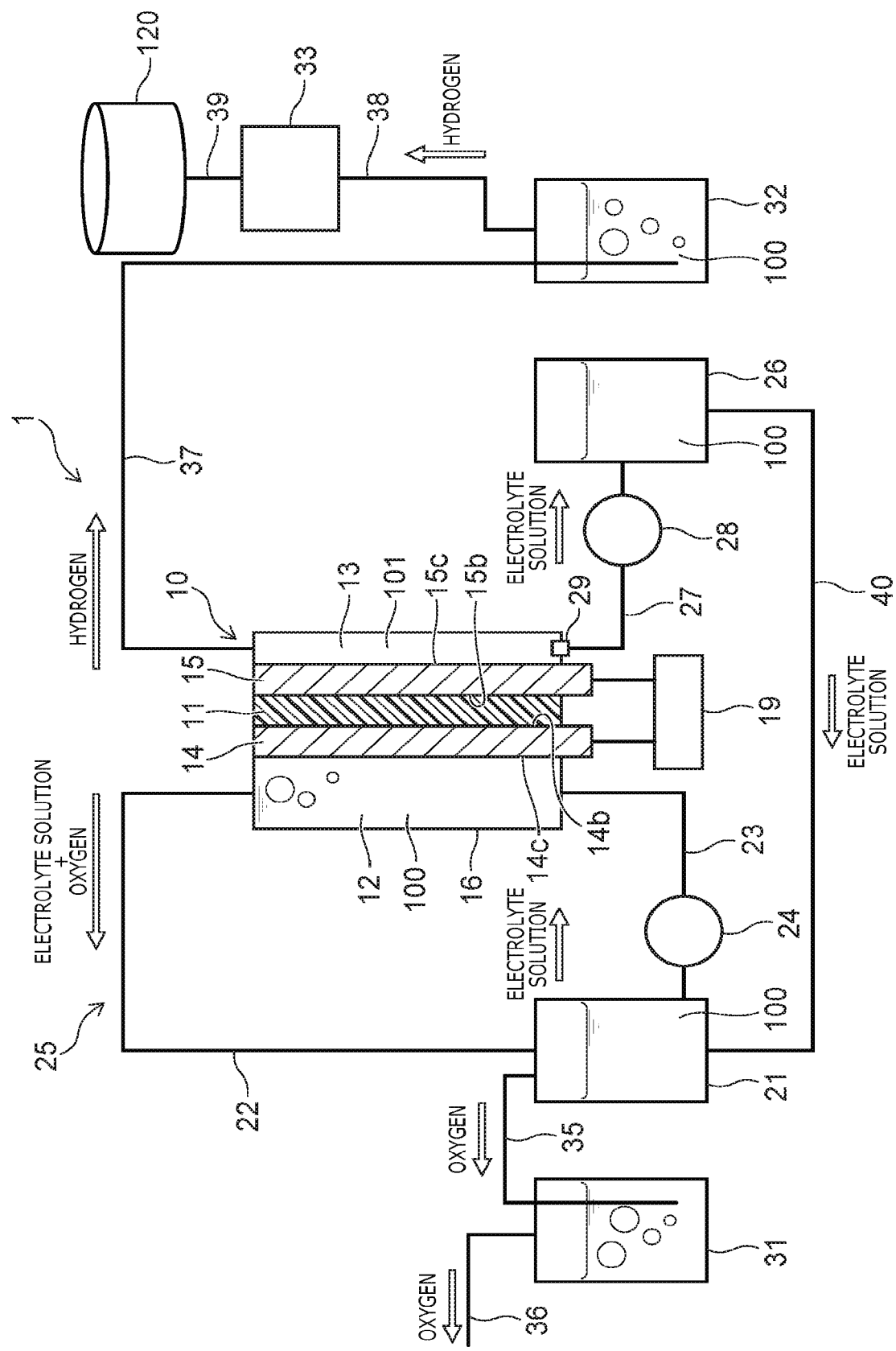
FIG. 1 is a block diagram showing a hydrogen production apparatus according to a first embodiment.

FIG. 1 is a block diagram showing a hydrogen production apparatus according to the embodiment.

Figure 2:
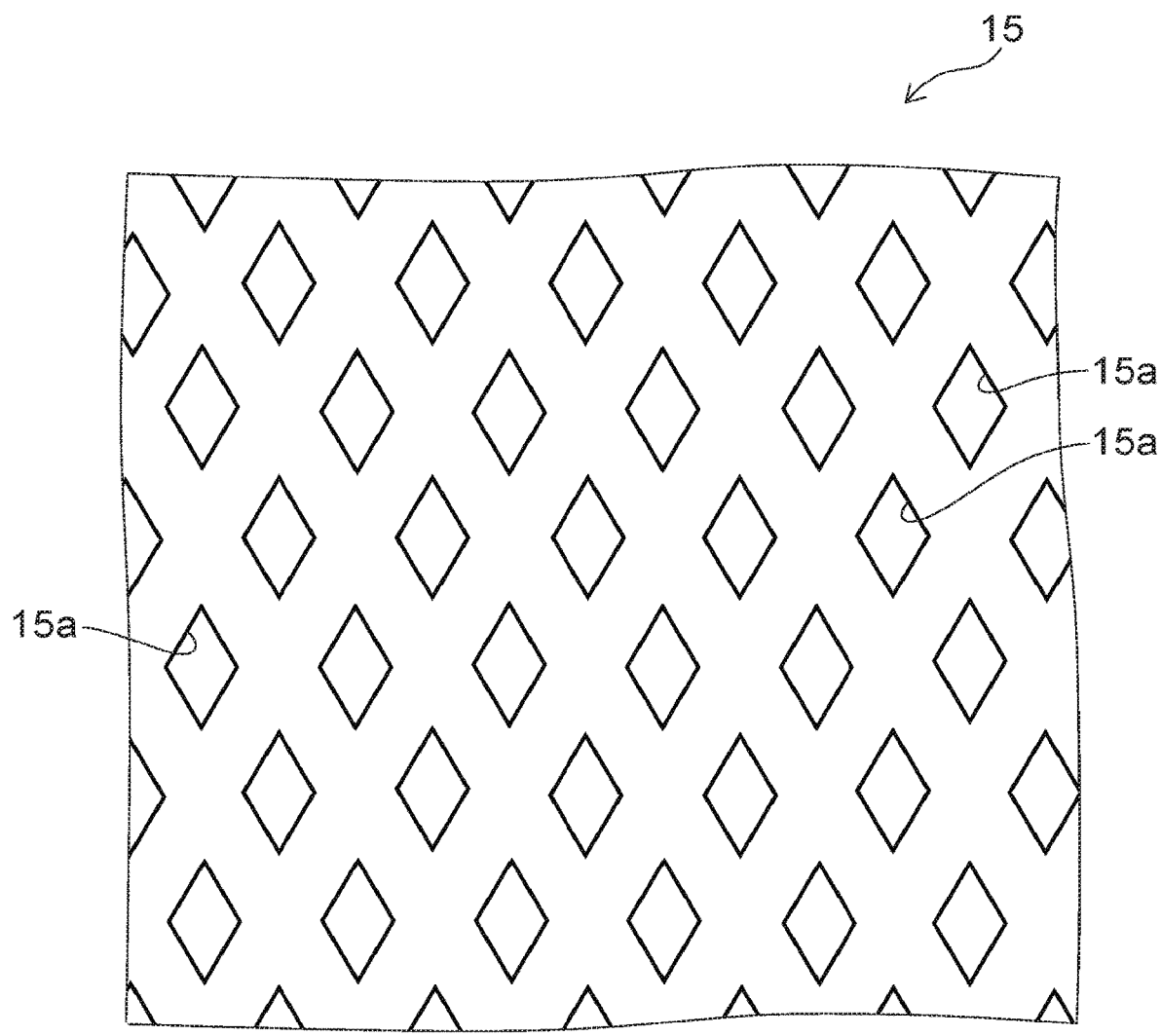
FIG. 2 is a plan view showing a negative electrode of the first embodiment.

FIG. 2 is a plan view showing a negative electrode of the embodiment.

As shown in FIG. 1, an electrolytic cell 10 is provided in the hydrogen production apparatus 1 according to the embodiment. Also, in the embodiment, for example, an alkaline electrolyte solution 100 is used as the electrolyte solution. However, the electrolyte solution may be neutral or acidic. A housing 16 is provided in the electrolytic cell 10; and a diaphragm 11 (a first diaphragm) is provided inside the housing 16. The interior of the housing 16 is partitioned into a positive-side cell 12 (a first cell) and a negative-side cell 13 (a second cell) by the diaphragm 11. The diaphragm 11 is, for example, a porous membrane made of a resin material, and is a membrane that allows passage of water molecules and ions but does not allow passage of large bubbles. The diaphragm 11 may be formed of an insulative porous material and may be formed of, for example, a ceramic material.

The thickness, i.e., the length in the arrangement direction of the positive-side cell 12 and the negative-side cell 13, of the negative-side cell 13 is shorter than the thickness of the positive-side cell 12. Therefore, the volume of the negative-side cell 13 is smaller than the volume of the positive-side cell 12. A positive electrode 14 (a first electrode) is provided inside the positive-side cell 12; and a negative electrode 15 (a second electrode) is provided inside the negative-side cell 13. A surface 14b (a first surface) of the positive electrode 14 and a surface 15b (a third surface) of the negative electrode 15 contact the diaphragm 11 and sandwich the diaphragm 11.

The positive-side cell 12, which corresponds to the first cell, is configured to be supplied with the alkaline electrolyte solution 100, e.g., a potassium hydroxide (KOH) aqueous solution. The electrolyte solution 100, which is supplied to the positive-side cell 12, is held inside the positive-side cell 12. On the other hand, only an extremely small amount of the electrolyte solution 100 exists inside the negative-side cell 13; and a vapor phase 101 occupies the greater part of the negative-side cell 13. For example, the electrolyte solution 100 exists in not less than half of the volume of the positive-side cell 12; and the vapor phase 101 exists in not less than half of the volume of the negative-side cell 13. Therefore, the greater part, i.e., at least half, of the surface 14c (a second surface) of the positive electrode 14 on the side not contacting the diaphragm 11 contacts the electrolyte solution 100; and the greater part, i.e., at least half, of the surface 15c (a fourth surface) of the negative electrode 15 on the side not contacting the diaphragm 11 contacts the vapor phase 101.

As shown in FIG. 2, the configuration of the negative electrode 15 is, for example, a mesh configuration; and many openings 15a (second holes) are formed in the negative electrode 15. The configuration of the positive electrode 14 also is a mesh configuration similar to that of the negative electrode 15; and many openings 14a (first holes, referring to FIG. 3) are formed in the positive electrode 14. It is sufficient for the configurations of the negative electrode 15 and the positive electrode 14 to be configurations in which many openings are formed; and the configurations are not limited to mesh configurations.

As shown in FIG. 1, a rectifier 19 is provided in the hydrogen production apparatus 1. Electrical power from outside the hydrogen production apparatus 1 is supplied to the rectifier 19; and the rectifier 19 applies direct current power between the positive electrode 14 and the negative electrode 15.

A positive-side electrolyte solution tank 21 is provided in the hydrogen production apparatus 1. A pipe 22 is connected between the upper part of the positive-side cell 12 and the upper part of the positive-side electrolyte solution tank 21. In the specification, "connected" refers to being mechanically linked so that a fluid can flow between the interiors. A pipe 23 is connected between the lower part of the positive-side electrolyte solution tank 21 and the lower part of the positive-side cell 12. A pump 24 is interposed partway through the pipe 23. A flow channel 25 that has a loop configuration is formed of the positive-side cell 12, the pipe 22, the positive-side electrolyte solution tank 21, the pipe 23, and the pump 24. The electrolyte solution 100 is circulated along the flow channel 25 by the pump 24 operating.

A negative-side electrolyte solution tank 26 is provided in the hydrogen production apparatus 1. A discharge port 29 is provided at the lower part, e.g., the bottom surface, of the negative-side cell 13. The discharge port 29 is, for example, a plughole. A pipe 27 is connected between the discharge port 29 and the upper part of the negative-side electrolyte solution tank 26. A pump 28 is interposed partway through the pipe 27. The electrolyte solution 100 that collects in the lower part of the negative-side cell 13 is discharged via the pipe 27 into the negative-side electrolyte solution tank 26 by the pump 28 operating. However, a pump is not provided to move the electrolyte solution 100 from the negative-side electrolyte solution tank 26 to the negative-side cell 13. Therefore, the electrolyte solution 100 is not circulated between the negative-side cell 13 and the negative-side electrolyte solution tank 26; and other than the electrolyte solution 100 seeping from the openings 15a of the negative electrode 15, the electrolyte solution 100 moves only unidirectionally from the negative-side cell 13 to the negative-side electrolyte solution tank 26. In other words, the negative-side cell 13 is supplied with the electrolyte solution 100 distributed only through the openings 14a of the positive electrode 14, the diaphragm 11, and the openings 15a of the negative electrode 15 from the positive-side cell 12.

As shown in FIG. 1, an oxygen gas scrubbing tower 31, a hydrogen gas scrubbing tower 32, a compressor 33, and pipes 35 to 40 are provided in the hydrogen production apparatus 1. A hydrogen storage tank 120 is provided outside the hydrogen production apparatus 1. The pipe 35 is connected between the upper part of the positive-side electrolyte solution tank 21 and the lower part of the oxygen gas scrubbing tower 31; and the pipe 36 is drawn out outside the hydrogen production apparatus 1 from the upper part of the oxygen gas scrubbing tower 31. The pipe 37 is connected between the upper part of the negative-side cell 13 and the lower part of the hydrogen gas scrubbing tower 32; the pipe 38 is connected between the upper part of the hydrogen gas scrubbing tower 32 and the compressor 33; and the pipe 39 is connected between the compressor 33 and the exterior hydrogen storage tank 120. The pipe 40 is connected between the positive-side electrolyte solution tank 21 and the negative-side electrolyte solution tank 26. The pipe 27, the pump 28, the negative-side electrolyte solution tank 26, and the pipe 40 are a unit that moves the electrolyte solution 100 from the bottom part of the negative-side cell 13 to the positive-side electrolyte solution tank 21.

Operations of the hydrogen production apparatus according to the embodiment will now be described.

Figure 3:
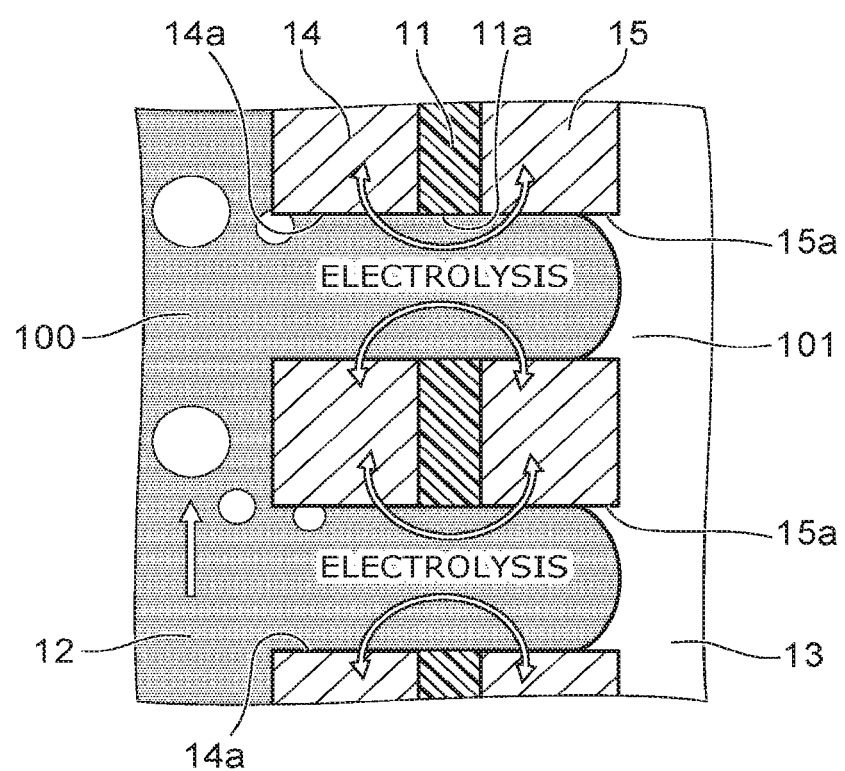
FIG. 3 is a cross-sectional view showing operations of the hydrogen production apparatus according to the first embodiment.

FIG. 3 is a cross-sectional view showing the operations of the hydrogen production apparatus according to the embodiment.

As shown in FIG. 1, the electrolyte solution 100 is introduced to the positive-side cell 12 and the positive-side electrolyte solution tank 21 of the electrolytic cell 10. On the other hand, the electrolyte solution 100 is not introduced to the negative-side cell 13; and the interior of the negative-side cell 13 remains as the vapor phase 101. The electrolyte solution 100 is an alkaline aqueous solution and is, for example, a potassium hydroxide aqueous solution. A scrubbing liquid, e.g., purified water, is introduced to the oxygen gas scrubbing tower 31 and the hydrogen gas scrubbing tower 32. By the pump 24 operating, the electrolyte solution 100 is circulated along the flow channel 25 in the order of (positive-side electrolyte solution tank 21→pipe 23→positive-side cell 12→pipe 22→positive-side electrolyte solution tank 21).

At this time, as shown in FIG. 3, the electrolyte solution 100 that is filled into the positive-side cell 12 seeps to the interface vicinity between the negative electrode 15 and the vapor phase 101 via the openings 14a of the positive electrode 14, pores 11a of the diaphragm 11, and the openings 15a of the negative electrode 15 and stops at the outlet vicinity of the openings 15a due to the surface tension of the electrolyte solution 100. Therefore, the positive electrode 14 and the negative electrode 15 both contact the electrolyte solution 100.

When electrical power is supplied from the outside to the rectifier 19 in this state as shown in FIG. 1, the rectifier 19 supplies direct current power between the positive electrode 14 and the negative electrode 15. Thereby, the following reaction occurs in the electrolyte solution 100 between the positive electrode 14 and the negative electrode 15.

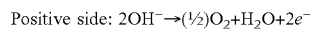

Positive side: $2OH^- \rightarrow (½)O_2 + H_2O + 2e^-$

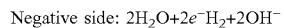

Negative side: $2H_2O + 2e^- \rightarrow H_2 + 2OH^-$

As a result, the water is electrolyzed; water ($H_2O$) and oxygen gas ($O_2$) are produced in the positive-side cell 12; and in the negative-side cell 13, water is consumed and hydrogen gas ($H_2$) is produced. Although the oxygen gas that is produced clings at the vicinity of the openings 14a of the positive electrode 14 as small bubbles, the oxygen gas is stripped from the positive electrode 14 by the circulating electrolyte solution 100 and is moved into the upper part of the positive-side cell 12. On the other hand, the hydrogen gas that is produced diffuses as-is inside the vapor phase 101 via the openings 15a of the negative electrode 15 and moves into the upper part of the negative-side cell 13.

The oxygen gas that is produced in the positive-side cell 12 flows with the electrolyte solution 100 via the pipe 22 into the positive-side electrolyte solution tank 21 and is separated from the electrolyte solution 100 inside the positive-side electrolyte solution tank 21. The oxygen gas that is separated is pulled into the oxygen gas scrubbing tower 31 via the pipe 35; the electrolyte solution 100 is further removed by the oxygen gas contacting the scrubbing liquid; subsequently, the oxygen gas is discharged outside the hydrogen production apparatus 1 via the pipe 36.

On the other hand, the hydrogen gas that is produced in the negative-side cell 13 is pulled into the hydrogen gas scrubbing tower 32 via the pipe 37; impurities are removed by contacting the scrubbing liquid; subsequently, the hydrogen gas is supplied to the compressor 33 via the pipe 38. The compressor 33 compresses the hydrogen gas and supplies the hydrogen gas to the hydrogen storage tank 120 via the pipe 39. The hydrogen storage tank 120 stores the hydrogen gas.

In the electrolysis process described above, a small amount of the electrolyte solution 100 may seep from the openings 15a of the negative electrode 15, travel along the surface of the negative electrode 15, fall, and collect at the bottom part of the negative-side cell 13. In such a case, the electrolyte solution 100 is moved into the negative-side electrolyte solution tank 26 via the pipe 27 by operating the pump 28. The electrolyte solution 100 that is held inside the negative-side electrolyte solution tank 26 is returned to the positive-side electrolyte solution tank 21 via the pipe 40.

The electrolyte solution 100 that collects in the negative-side electrolyte solution tank 26 may be moved forcibly to the positive-side electrolyte solution tank 21 by providing a pump partway through the pipe 40. Also, although an example is shown in the embodiment in which the pipe 27, the pump 28, the negative-side electrolyte solution tank 26, and the pipe 40 are provided as the unit moving the electrolyte solution 100 from the bottom part of the negative-side cell 13 to the positive-side electrolyte solution tank 21, this is not limited thereto. For example, the positive-side electrolyte solution tank 21 may be mounted lower than the electrolytic cell 10; and the electrolyte solution 100 may be caused to fall into the positive-side electrolyte solution tank 21 from the negative-side cell 13 via a pipe. In such a case, it is favorable to provide a backflow prevention mechanism such as a valve or the like partway through the pipe so that the oxygen gas inside the positive-side electrolyte solution tank 21 does not flow into the negative-side cell 13. Thereby, the negative-side electrolyte solution tank 26 and the pump 28 can be omitted.

Effects of the embodiment will now be described.

As shown in FIG. 1, the oxygen that is produced by the electrolysis of the water mixes into the electrolyte solution 100 in the positive-side cell 12 of the electrolytic cell 10. The greater part of the oxygen mixing into the electrolyte solution 100 is separated from the electrolyte solution 100 inside the positive-side electrolyte solution tank 21; but a part of the oxygen remains inside the electrolyte solution 100 in a nanobubble state or in a state of being dissolved in the electrolyte solution 100.

If the electrolyte solution 100 in which oxygen thus remains is mixed into the negative-side cell 13, the oxygen mixes into the hydrogen gas; and the purity of the hydrogen gas decreases. However, in the hydrogen production apparatus 1 according to the embodiment as described above, the negative-side cell 13 is cut off from the flow channel 25; and the electrolyte solution 100 itself substantially does not leak into the negative-side cell 13. Therefore, the oxygen that is inside the electrolyte solution 100 substantially does not mix into the hydrogen gas; and hydrogen gas that has higher purity can be obtained.

Also, according to the embodiment, the configuration of the hydrogen production apparatus 1 can be simplified because it is unnecessary to perform gas-liquid separation in the negative-side electrolyte solution tank 26. Then, it is possible to suppress the power consumption amount necessary to produce the hydrogen gas by the amount that the gas-liquid separation is unnecessary. Also, for the same electrical power supply amount, it is possible to increase the production amount of the hydrogen gas compared to the conventional production amount. Further, the volume of the negative-side cell 13 can be smaller than the volume of the positive-side cell 12 because it is unnecessary to hold a prescribed amount of the electrolyte solution 100 inside the negative-side cell 13. Thereby, it is possible to downsize the hydrogen production apparatus 1. As a result, the equipment cost, the transport cost, and the installation cost of the hydrogen production apparatus 1 can be reduced. Or, the hydrogen amount that can be produced can be increased by increasing the number of pairs of the positive-side cell 12 and the negative-side cell 13 while maintaining the size of the hydrogen production apparatus 1.

While the liquid phase is provided in the positive-side cell 12, and the vapor phase is provided in the negative-side cell 13 in the embodiment, the vapor phase may be provided in the positive-side cell 12, and the liquid phase may be provided in the negative-side cell 13.

Second Embodiment

A second embodiment will now be described.

Figure 4:
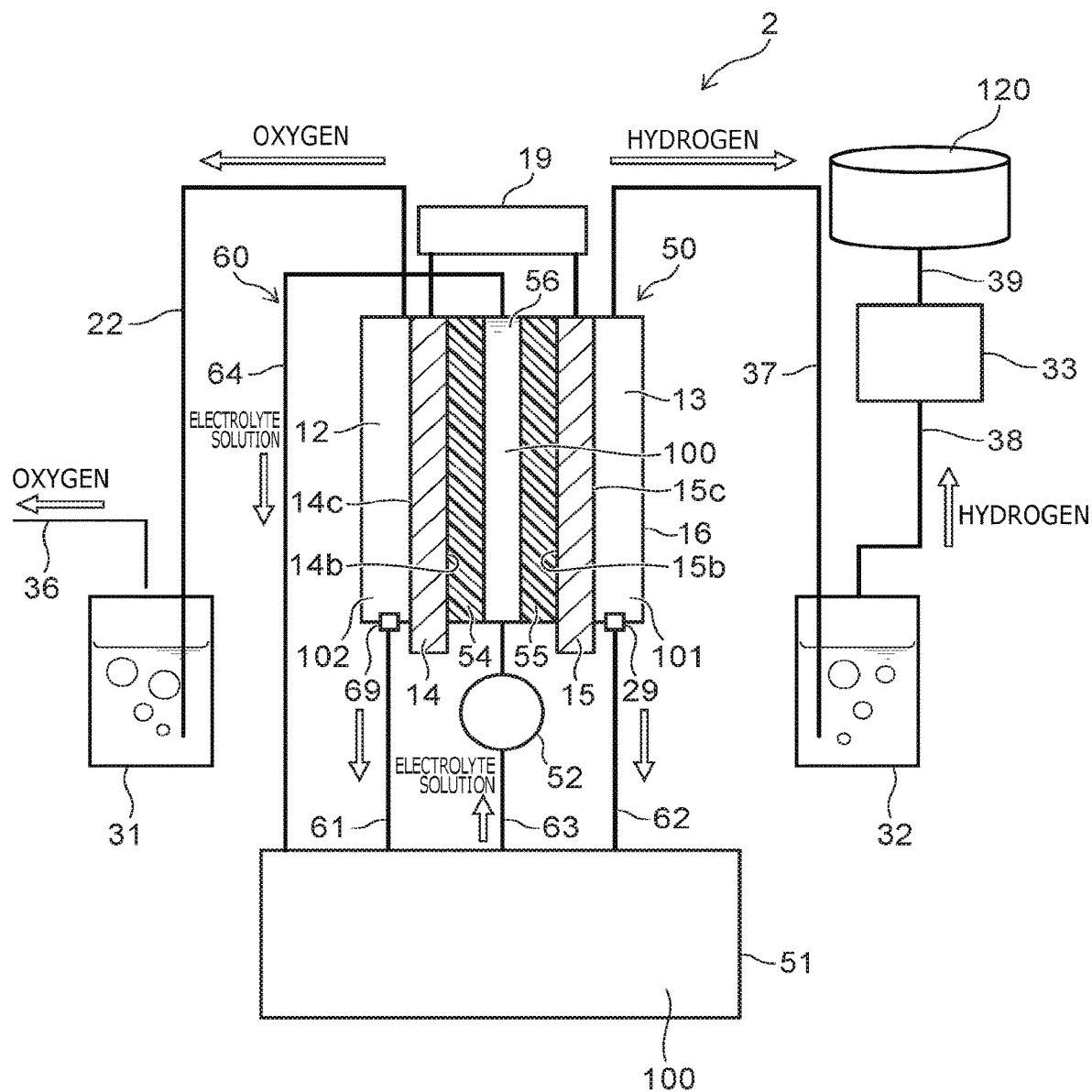
FIG. 4 is a block diagram showing a hydrogen production apparatus according to a second embodiment.

FIG. 4 is a block diagram showing a hydrogen production apparatus according to the embodiment.

As shown in FIG. 4, the hydrogen production apparatus 2 according to the embodiment differs from the hydrogen production apparatus 1 according to the first embodiment described above (referring to FIG. 1) in that an electrolytic cell 50 is provided instead of the electrolytic cell 10; an electrolyte solution tank 51 is provided instead of the positive-side electrolyte solution tank 21 and the negative-side electrolyte solution tank 26; and a pump 52 is provided as a supply part instead of the pumps 24 and 28.

A housing 16 is provided in the electrolytic cell 50; and the positive electrode 14 and the negative electrode 15 are provided to be separated from each other inside the housing 16. A positive-side diaphragm 54 (a second diaphragm) and a negative-side diaphragm 55 (a first diaphragm) are provided to be separated from each other between the positive electrode 14 and the negative electrode 15. The surface of the positive electrode 14 on the negative electrode 15 side contacts the positive-side diaphragm 54; and the surface of the negative electrode 15 on the positive electrode 14 side contacts the negative-side diaphragm 55.

The part of the electrolytic cell 50 on the side opposite to the negative electrode 15 when viewed from the positive electrode 14 is used as the positive-side cell 12 (a third cell); and the part of the electrolytic cell 50 on the side opposite to the positive electrode 14 when viewed from the negative electrode 15 is used as the negative-side cell 13 (the second cell). A center cell 56 (a fourth cell) is between the positive-side diaphragm 54 and the negative-side diaphragm 55. In the present embodiment, the first cell comprises the third cell referred to as the positive-side cell 12 and the fourth cell referred to as the center cell 56. The positive-side diaphragm 54, which is referred to as the second diaphragm, partitions the first cell provided interior of the housing 16 into the positive-side cell 12 and the center cell 56. The negative-side diaphragm 55 partitions the negative-side cell 13 from the center cell 56, which is a part of the first cell. The negative-side diaphragm 55 corresponds to the first diaphragm that partitions the interior of the housing 16 into the first cell and the second cell.

For example, the electrolyte solution tank 51 is disposed lower than the electrolytic cell 50. A discharge port 69 is provided at the lower part, e.g., the bottom surface, of the positive-side cell 12. A pipe 61 is connected between the discharge port 69 and the upper part of the electrolyte solution tank 51. The discharge port 29 is provided at the lower part, e.g., the bottom surface, of the negative-side cell 13. A pipe 62 is connected between the discharge port 29 and the upper part of the electrolyte solution tank 51. A pipe 63 is connected between the electrolyte solution tank 51 and the center cell 56. The pump 52 is interposed partway through the pipe 63. A pipe 64 is connected between the upper part of the center cell 56 and the upper part of the electrolyte solution tank 51. A flow channel 60 of the electrolyte solution 100 is formed of the center cell 56, the pipe 64, the electrolyte solution tank 51, the pipe 63, and the pump 52. Then, by the pump 52 operating, the electrolyte solution 100 is circulated along the flow channel 60; and the electrolyte solution 100 is supplied from the electrolyte solution tank 51 to the center cell 56. Also, the pipe 22 is connected between the upper part of the positive-side cell 12 and the lower part of the oxygen gas scrubbing tower 31.

The center cell 56, which is a part of the first cell as well as the fourth cell, is configured to be supplied with the electrolyte solution 100. The electrolyte solution 100 is held inside the electrolyte solution tank 51 and inside the center cell 56. The interior of the positive-side cell 12 is occupied by a vapor phase 102. The interior of the negative-side cell 13 is occupied by the vapor phase 101. The positive electrode 14 contacts the vapor phase 102; and the negative electrode 15 contacts the vapor phase 101. The positive-side cell 12 is supplied with the electrolyte solution 100 distributed only through the positive-side diaphragm 54 and the openings 14a of the positive electrode 14 from the center cell 56. The negative-side cell 13 is supplied with the electrolyte solution 100 distributed only through the negative-side diaphragm 55 and the openings 15a of the negative electrode 15 from the center cell 56.

Operations of the hydrogen production apparatus according to the embodiment will now be described.

In the first embodiment described above, the oxygen gas that is produced by the electrolysis is released into the electrolyte solution 100 inside the positive-side cell 12; and the hydrogen gas is released into the vapor phase 101 inside the negative-side cell 13. Conversely, in the embodiment, the oxygen gas also is released into the vapor phase 102.

Details will now be described.

As shown in FIG. 4, the electrolyte solution 100 is introduced to the center cell 56 of the electrolytic cell 50 and to the electrolyte solution tank 51. At this time, the electrolyte solution 100 is not introduced to the positive-side cell 12 or the negative-side cell 13; and the positive-side cell 12 and the negative-side cell 13 respectively remain as the vapor phase 102 and the vapor phase 101. Also, a scrubbing liquid, e.g., purified water, is introduced to the oxygen gas scrubbing tower 31 and the hydrogen gas scrubbing tower 32. Then, by the pump 52 operating, the electrolyte solution 100 is circulated along the flow channel 60 in the order of (electrolyte solution tank 51→pipe 63→center cell 56→pipe 64→electrolyte solution tank 51).

At this time, the electrolyte solution 100 that is filled into the center cell 56 seeps to the interface vicinity between the positive electrode 14 and the vapor phase 102 via pores (not illustrated) of the positive-side diaphragm 54 and the openings 14a (referring to FIG. 3) of the positive electrode 14. On the other hand, the electrolyte solution 100 that is filled into the center cell 56 seeps to the interface vicinity between the negative electrode 15 and the vapor phase 101 via pores (not illustrated) of the negative-side diaphragm 55 and the openings 15a (referring to FIG. 3) of the negative electrode 15. Thereby, the positive electrode 14 and the negative electrode 15 both contact the electrolyte solution 100.

When electrical power is supplied from the outside to the rectifier 19 in this state, the water is electrolyzed between the positive electrode 14 and the negative electrode 15; oxygen gas is produced in the positive-side cell 12; and hydrogen gas is produced in the negative-side cell 13. The oxygen gas that is produced diffuses as-is inside the vapor phase 102 via the openings 14a of the positive electrode 14 and moves into the upper part of the positive-side cell 12. On the other hand, similarly to the first embodiment, the hydrogen gas that is produced diffuses as-is inside the vapor phase 101 via the openings 15a of the negative electrode 15 and moves into the upper part of the negative-side cell 13.

Also, in the electrolysis process described above, the electrolyte solution 100 may seep from the openings 14a of the positive electrode 14, travel along the surface of the positive electrode 14, fall, and collect at the bottom part of the positive-side cell 12. The electrolyte solution 100 that collects at the bottom part of the positive-side cell 12 falls into the electrolyte solution tank 51 via the pipe 61. Similarly, the electrolyte solution 100 may seep from the openings 15a of the negative electrode 15, travel along the surface of the negative electrode 15, fall, and collect at the bottom part of the negative-side cell 13. The electrolyte solution 100 that collects at the bottom part of the negative-side cell 13 falls into the electrolyte solution tank 51 via the pipe 62. In the case where the electrolyte solution tank 51 cannot be disposed below the electrolytic cell 50, a pump may be provided partway through the pipe 61 and the pipe 62; and the electrolyte solution 100 may be moved forcibly.

Effects of the embodiment will now be described.

In the embodiment, the mixing of the oxygen into the electrolyte solution 100 can be suppressed because the flow channel 60 of the electrolyte solution 100 is cut off from the positive-side cell 12. Also, even in the case where a small amount of oxygen mixes into the electrolyte solution 100, the mixing into the hydrogen gas of the oxygen inside the electrolyte solution 100 can be suppressed because the negative-side cell 13 is cut off from the flow channel 60. As a result, hydrogen gas that has higher purity can be obtained.

Comparative Example

A comparative example will now be described.

Figure 5:
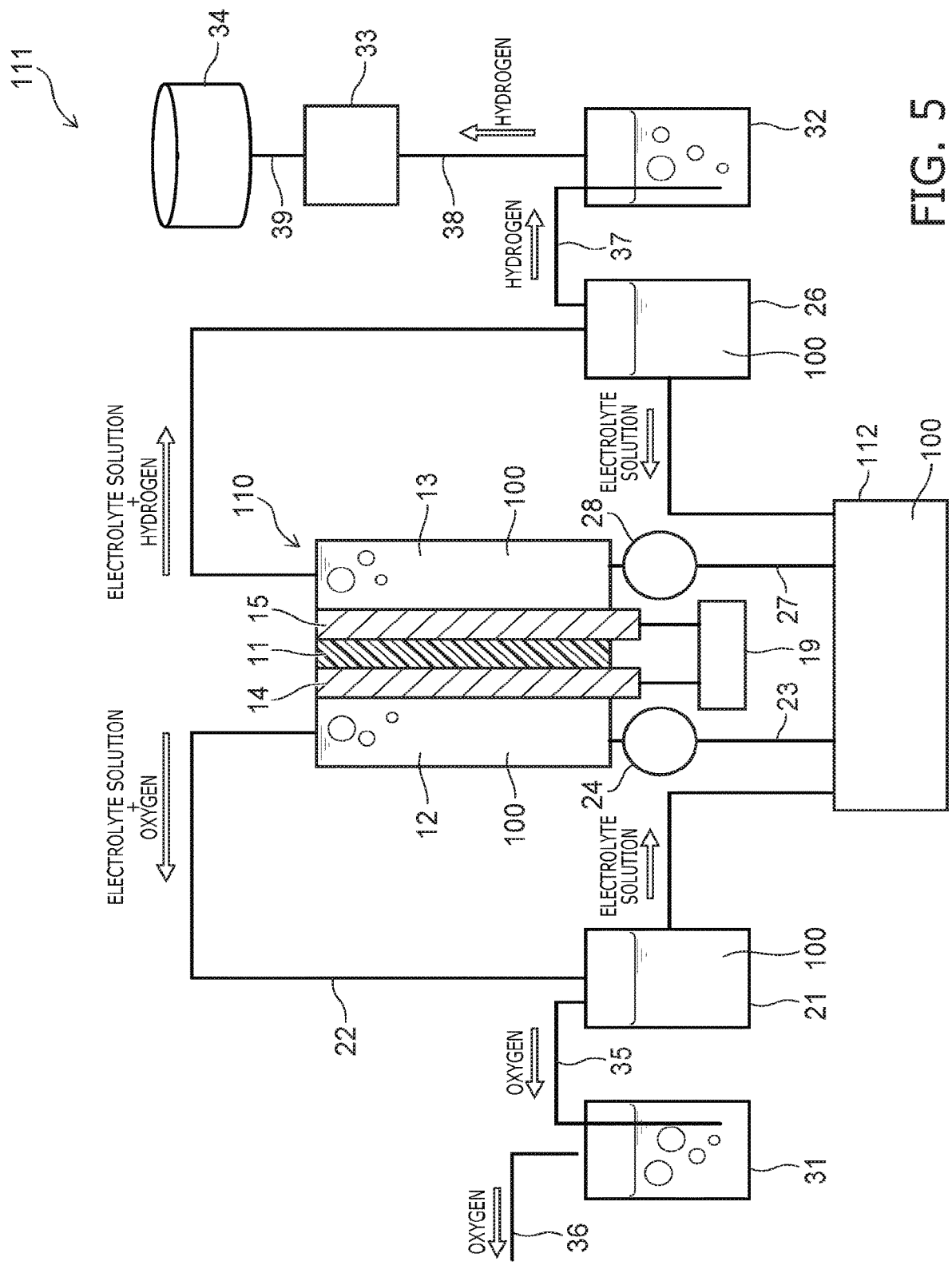
FIG. 5 is a block diagram showing a hydrogen production apparatus according to a comparative example.

FIG. 5 is a block diagram showing a hydrogen production apparatus according to the comparative example.

As shown in FIG. 5, an electrolytic cell 110 is provided in the hydrogen production apparatus 111 according to the comparative example. In the electrolytic cell 110, the positive-side cell 12 and the negative-side cell 13 are partitioned by the diaphragm 11; and the electrolyte solution 100 is held in both the positive-side cell 12 and the negative-side cell 13. Then, the electrolyte solution 100 falls from the positive-side cell 12 and the negative-side cell 13 into the same electrolyte solution tank 112; and the electrolyte solution 100 is supplied from the electrolyte solution tank 112 to the positive-side cell 12 and the negative-side cell 13. In other words, the flow channel that circulates the electrolyte solution 100 for the positive-side cell 12 and the flow channel that circulates the electrolyte solution 100 for the negative-side cell 13 share the one electrolyte solution tank 112.

Therefore, the oxygen that mixes into the electrolyte solution 100 in the positive-side cell 12 flows into the negative-side cell 13 via the electrolyte solution tank 112. As a result, the oxygen mixes into the hydrogen gas produced in the negative-side cell 13; and the purity of the hydrogen gas decreases.

Although the inflow amount of the oxygen also can be suppressed by reducing the circulation flow rate of the electrolyte solution 100, in such a case, the effect of stripping, from the negative electrode 15, the bubbles of the hydrogen gas clinging to the negative electrode 15 decreases; and the production efficiency of hydrogen decreases. Therefore, even in the case where the current density provided to the electrolytic cell 110 is increased, a commensurate amount of hydrogen cannot be produced.

Conversely, according to the embodiments described above, the circulation flow channel of the electrolyte solution 100 is cut off from the negative-side cell 13; therefore, high-purity hydrogen gas can be produced even when the circulation flow rate of the electrolyte solution 100 is increased. Thereby, the hydrogen can be produced efficiently even when the current density provided to the electrolytic cell is increased.

For example, the hydrogen production apparatuses according to the embodiments described above may be installed adjacent to a power generation facility utilizing renewable energy, e.g., a wind power generation facility or a solar power generation facility. Unlike fossil fuels, renewable energy is drawing attention as an energy source of the future because renewable energy is sustainable and generally does not produce carbon dioxide when generating power. However, temporal fluctuation of the power generation amount often occurs in power generation utilizing renewable energy. For example, the power generation amount of a wind power generation facility fluctuates depending on the wind; and the power generation amount of a solar power generation facility fluctuates depending on the solar radiation amount.

Therefore, the electrical power that is generated by renewable energy is fed into a hydrogen production apparatus; hydrogen is produced; the hydrogen is stored in a hydrogen storage tank; and the hydrogen is recovered as necessary and converted into electrical power by a fuel cell. Thereby, it is unnecessary to match the time of the power generation and the time of use; and renewable energy can be utilized efficiently. Also, as described above, by increasing the circulation flow rate of the electrolyte solution of the hydrogen production apparatus, the large current that is generated when the power generation amount is temporarily large, e.g., when a strong wind is blowing or when solar radiation is intense, can be utilized efficiently to produce hydrogen. Thus, the renewable energy can be recovered efficiently by configuring a system in which the hydrogen production apparatuses according to the embodiments described above are combined with a power generation facility utilizing renewable energy.

In power generation that utilizes renewable energy, there is a risk that the production purity of the hydrogen gas may decrease in the case where the power generation amount temporally fluctuates or decreases. In such a case, in the embodiment, the power consumption amount that is necessary to produce the hydrogen gas is suppressed compared to conventional production; and it is possible to suppress the decrease of the production purity of the hydrogen gas.

Test Example

A test example will now be described.

Figure 6:
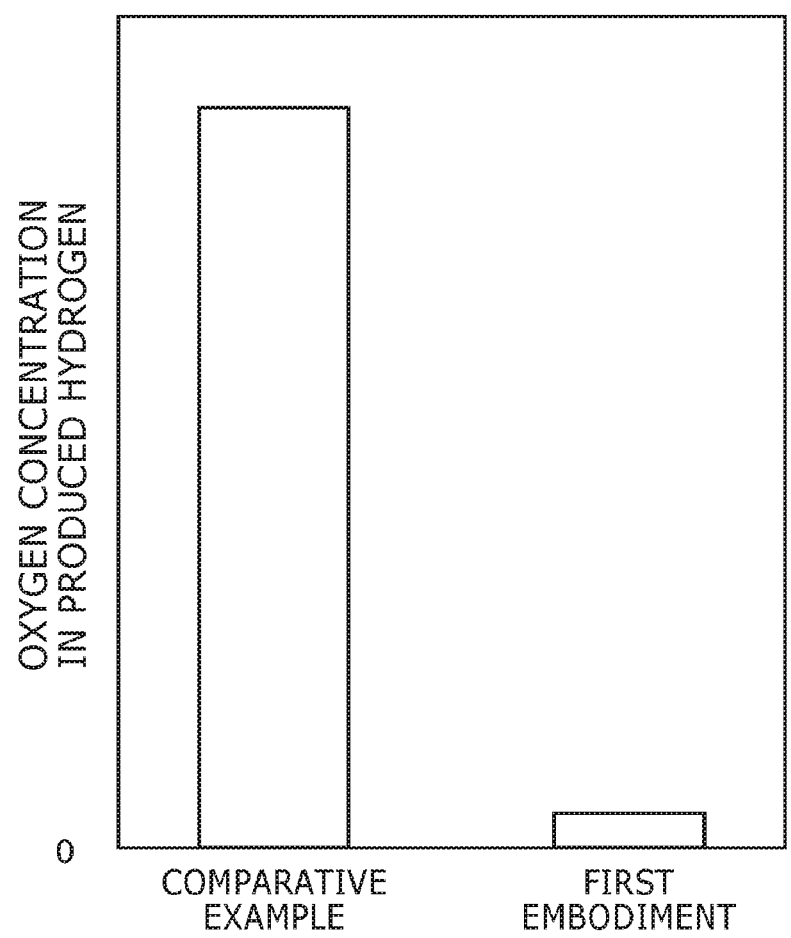
FIG. 6 is a graph showing effects of the first embodiment, in which the horizontal axis is type of hydrogen production apparatus, and the vertical axis is oxygen concentration in a produced hydrogen gas.

FIG. 6 is a graph showing the effects of the first embodiment, in which the horizontal axis is the type of hydrogen production apparatus, and the vertical axis is the oxygen concentration in the produced hydrogen gas.

Hydrogen was produced using the hydrogen production apparatus 1 according to the first embodiment described above and the hydrogen production apparatus 111 according to the comparative example; and the oxygen concentration in the produced hydrogen gas was measured.

As shown in FIG. 6, according to the first embodiment, the oxygen concentration in the hydrogen gas can be reduced drastically compared to the comparative example.

According to the embodiments described above, an electrolytic cell and a hydrogen production apparatus can be realized in which hydrogen gas that has higher purity can be produced.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electrolytic cell, comprising:
a housing configured to hold an electrolyte solution;
a first diaphragm configured to partition an interior of the housing into a first cell and a second cell;
a second diaphragm configured to partition an interior of the first cell into a third cell and a fourth cell;
a first electrode provided inside the first cell, the first electrode comprising a first surface facing the first diaphragm, a second surface different from the first surface, and a first hole configured to distribute the electrolyte solution between the first surface side and the second surface side;
a second electrode provided inside the second cell adjacent to the first diaphragm, the second electrode comprising a third surface adjacent to the first diaphragm, a fourth surface different from the third surface, and a second hole configured to distribute the electrolyte solution between the third surface side and the fourth surface side; and
a first discharge port configured to discharge the electrolyte solution from the second cell, wherein
the first electrode is provided inside the third cell, the first surface of the first electrode being provided adjacent to the second diaphragm,
the first cell is configured to supply the electrolyte solution supplied therein to the third surface side of the second cell,
the fourth cell is provided between the first diaphragm and the second diaphragm, and
the fourth cell is configured to be supplied with the electrolyte solution.

2. The electrolyte cell according to claim 1, wherein the first electrode is a positive electrode, and the second electrode is a negative electrode.

3. The electrolytic cell according to claim 1, further comprising:
a second discharge port configured to discharge the electrolyte solution from the third cell, the electrolyte solution is distributed to the second surface side of the third cell through the first hole.

4. The electrolytic cell according to claim 3, wherein
the second cell is configured to be supplied with the electrolyte solution distributed only through the second hole, and
the third cell is configured to be supplied with the electrolyte solution distributed only through the first hole.

5. A hydrogen production apparatus, comprising:
the electrolytic cell according to claim 1;

an electrolyte solution tank configure to reserve the electrolyte solution; and
an electrolyte supply configure to supply the electrolyte solution to the fourth cell from the electrolyte solution tank.

* * * * *